United States Patent [19]

Globus et al.

[11] 4,241,985
[45] Dec. 30, 1980

[54] PANORAMIC CAMERA

[76] Inventors: Ronald P. Globus, 140 Fifth Ave., New York, N.Y. 10011; Richard D. Globus, 874 Broadway, New York, N.Y. 10003; Stephen E. Globus, 899 Broadway, New York, N.Y. 10003

[21] Appl. No.: 963,739

[22] Filed: Nov. 27, 1978

[51] Int. Cl.³ .................. G03B 37/02; G03B 17/02
[52] U.S. Cl. ................................. 354/99; 354/288; 354/94
[58] Field of Search .................. 185/37, 39; 354/94, 354/170, 212, 214, 215, 217, 218, 270, 288, 293, 99, 95–96, 98

[56] References Cited

U.S. PATENT DOCUMENTS

| | | | |
|---|---|---|---|
| 3,183,810 | 5/1965 | Campbell | 354/94 |
| 3,246,588 | 4/1966 | Waroux | 354/94 |
| 3,257,515 | 6/1966 | Nakamatsu | 352/158 X |
| 3,535,994 | 10/1970 | Maas et al. | 354/170 |
| 3,606,199 | 9/1971 | Fujimoto | 242/187 |

FOREIGN PATENT DOCUMENTS

| | | | |
|---|---|---|---|
| 1081329 | 12/1954 | France | 354/94 |
| 47-17860 | 5/1972 | Japan | 354/94 |

Primary Examiner—L. T. Hix
Assistant Examiner—Thomas H. Tarcza
Attorney, Agent, or Firm—Burns, Doane, Swecker & Mathis

[57] ABSTRACT

A panoramic camera is disclosed having a main body portion and a handle portion which is attached to the main body portion for rotation about a central axis. The main body portion includes a lens and slit arrangement with film being advanced within the camera with respect to the lens and slit arrangement. A lens of the arrangement is oriented radially with respect to a central axis of the panoramic camera. Means are provided within the main camera portion for rotating the handle with respect to the main body portion. The means for rotation preferably includes a resilient ribbon which is wound on a pair of spools. To provide a driving force for the panoramic camera, the ribbon is wound in a reverse manner on one of the spools and in a forward manner on the other spool. A tendency of the ribbon in favor of winding in a forward manner urges the main camera portion to rotate with respect to the handle. A speed governor is provided in the handle for limiting the relative rotation of the main camera portion with the handle to a constant velocity. The speed governor may take various forms such as a fluid and brush rotor arrangement. In preferred embodiments, the fluid may be either a viscous silicon oil, a hydrocarbon liquid or various colloidal suspensions. A pulley and belt arrangement is provided to operatively connect the handle with a film take-up mechanism of the main camera portion. A film cassette and a pair of film take-up spools of the mechanism are alternately driven by one-way roller clutches. Another one-way clutch in the speed governor allows the camera to automatically rewind the film.

32 Claims, 23 Drawing Figures

PANORAMIC CAMERA

BACKGROUND AND SUMMARY OF THE PRESENT INVENTION

The present invention relates generally to cameras, fluid speed governors and drive mechanisms and more particularly relates to panoramic cameras and speed governors and drive mechanisms for such instruments.

Photography which utilizes a slit in order to scan a panoramic view is believed to have been popularized initially in the 1850's. In any event, it is known that a slit camera was typically used at least as early as 1857 both for group photos and for scenic photography.

In about 1894, an apparatus was developed by M. Damoizeau of Paris for photographing a panorama extending throughout 360°. In that camera, a lens was moved past an advancing film in a direction opposite to the direction of movement of the film. The lens was moved in the opposite direction at about the same speed that the film was advanced.

A slightly different arrangement for panoramic photography was developed in about 1901 by the Lumiere brothers. This apparatus also was able to photograph a panorama extending 360°. In this arrangement, however, the film was held stationary while a lens and mirror arrangement rotated about the stationary film.

At the turn of the twentieth century, a large number of panoramic cameras were developed. During the First World War, a camera which was popularly known as the "Circuit Camera" was in widespread use. Also at about this time, panoramic cameras having an internal lens arrangement and stationary film were developed and used.

A wide angle lens was perfected for use in photography by about 1924 at which time a miniature 35 mm camera, commonly called the Leitz camera, became popular.

Soon afterwards, the panoramic camera became less popular and was only rarely used. It was not until the use of panoramic scan photography by military intelligence units during the Second World War that the panoramic camera was again used to any substantial extent. At that time, the panoramic photographs permitted the cross-reference and verification of information of maps.

During the early 1960's, interest in panoramic cameras was again aroused, especially among a small group of photographers. It was at this time that a number of new panoramic cameras were developed. The military also renewed interest in panoramic cameras which were found to be useful in high altitude equipment as recording instruments.

Numerous problems and disadvantages of panoramic cameras can be cited as contributing to the decline in interest in the panoramic camera from the time of the early 1900's. Conventional panoramic cameras are objectionable because of the occurrence of a series of vertical lines on the developed film as a result of uneven movement of the film. These vertical lines are referred to as "banding" and present one of the most difficult problems that occur in panoramic cameras. Each vertical line is typically caused by a very minor change in speed in the film which results in an underexposure of that portion of the film. This underexposure, however, is sufficient to result in the series of vertical white lines in the developed film.

Accordingly, it is an object of the present invention to provide a panoramic camera in which banding of the developed film is substantially reduced or eliminated particularly as a result of the elimination of gears and adjustments of the spacing of the slit with respect to the film.

Another objection to conventional panoramic cameras relates to the use of electric motors as drive mechanisms both for film advancement and for relative rotation of the main camera portion and handle. An electric motor including a gear cage and battery is typically expensive and constitutes a major portion of the cost of a camera. Furthermore, the electric motor and the other electrical portions of both panoramic and non-panoramic cameras are typically relatively unreliable in comparison with the non-electrical portions of the camera. For this reason, it is desirable to completely eliminate the electrical motor, gears and the battery systems of a camera.

Accordingly, a further object of the present invention is to provide a panoramic camera having a spring ribbon motor with a liquid rotor which obviates the need for an electric and gear drive mechanism.

Still another object of the present invention is to provide a panoramic camera having a high degree of reliability as a result of the substantial elimination of electrical circuitry and gearing.

The heretofore large size of the panoramic camera has resulted in another hindrance to the widespread use of panoramic cameras. The large size results in a camera which appears to be clumsy and awkward to the average consumer.

Therefore, yet still another object of the present invention is to provide a panoramic camera having a compact configuration whereby the physical size of the camera is substantially minimized.

The panoramic camera of the present invention includes a main camera portion and a handle which is rotatably attached to the main handle portion. A lens and slit arrangement is provided within the main camera portion for the continuous exposure of film. The film is crawl advanced within the camera with respect to the slit and lens arrangement. A drive mechanism which preferably includes a spring ribbon rotates the main camera portion with respect to the handle. The slit and lens arrangement is oriented radially with respect to a main axis of the panoramic camera so that rotation of the main camera portion permits the lens and slit arrangement to scan about the main axis. The spring ribbon of the main camera portion is wound in a reverse manner on a first spool and in a forward manner on a second spool with both spools having cam locks to limit the travel of the spring ribbon. A speed governor is provided in the handle to limit the speed of relative rotation between the main camera portion and the handle to a constant magnitude. The speed governor may include various arrangements and preferably includes a fluid and brush rotor mechanism. In preferred embodiments of the present invention the fluid may consist of a silicon oil, a hydrocarbon liquid having a high viscosity or one of a number of colloidal suspensions. A pulley and belt arrangement operatively connects the speed governor with the main camera portion. The film cassette and the film take-up spools are alternately driven by oneway roller clutches. Another one-way clutch in the speed governor allows the camera to automatically rewind the film.

DESCRIPTION OF THE DRAWINGS

With reference to the accompanying drawings, the preferred embodiments of the panoramic camera of the present invention are illustrated wherein like reference numerals refer to like members and wherein:

FIG. 10 is an exploded view of the speed governor and needle bearing arrangement of the panoramic camera of FIG. 1 with the handle outer casing cut away;

FIG. 17 is a pictorial view of the pulley and belt arrangement;

FIG. 18 is a pictorial illustration of a second embodiment of the speed governor of the panoramic camera of the present invention;

DETAILED DESCRIPTION OF THE PREFERRED EMBODIMENTS

Figure 1:
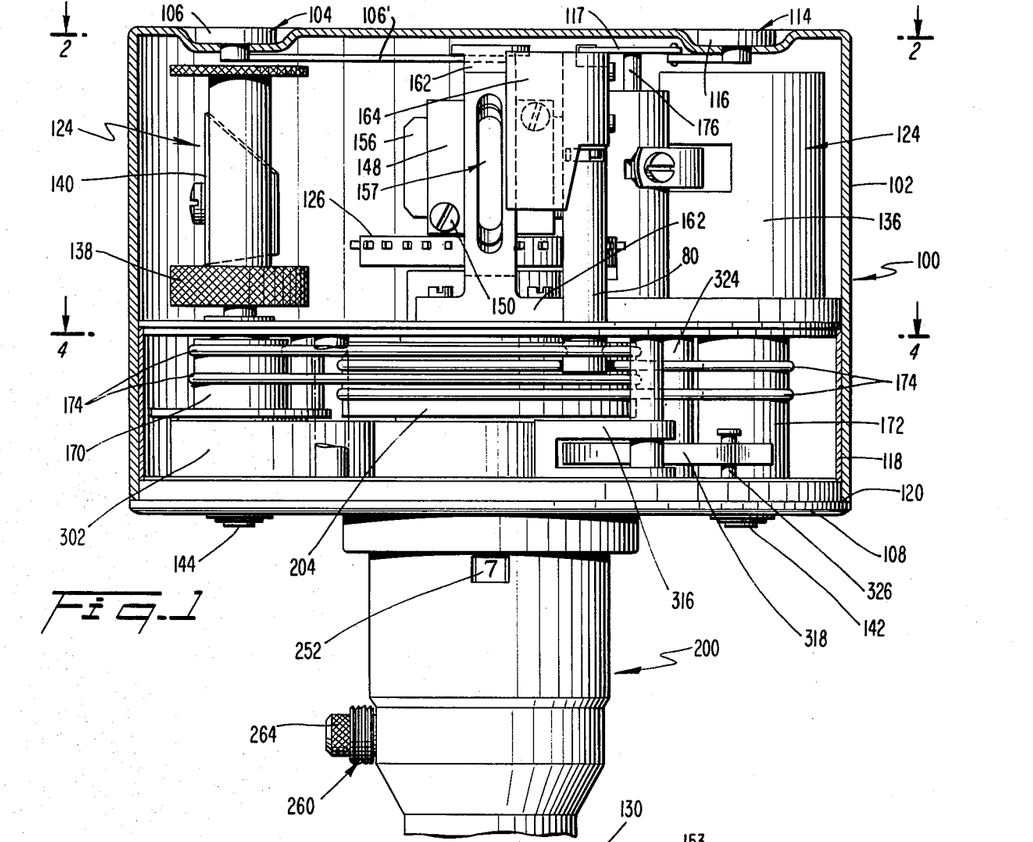
FIG. 1 is a front side view of a portion of a panoramic camera according to the present invention with the outer housing cut away.
Figure 2:
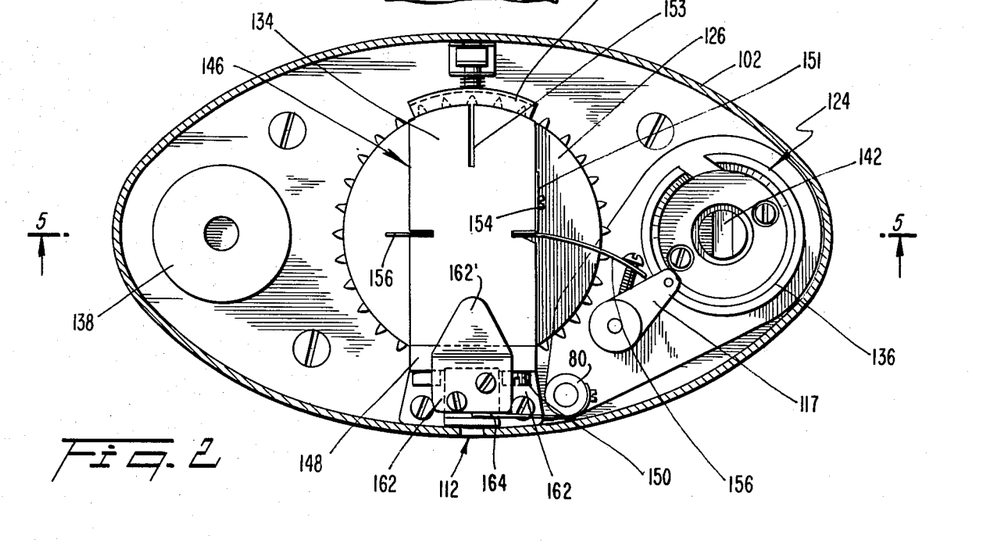
FIG. 2 is a view through the line 2—2 of FIG. 1.
Figure 3:
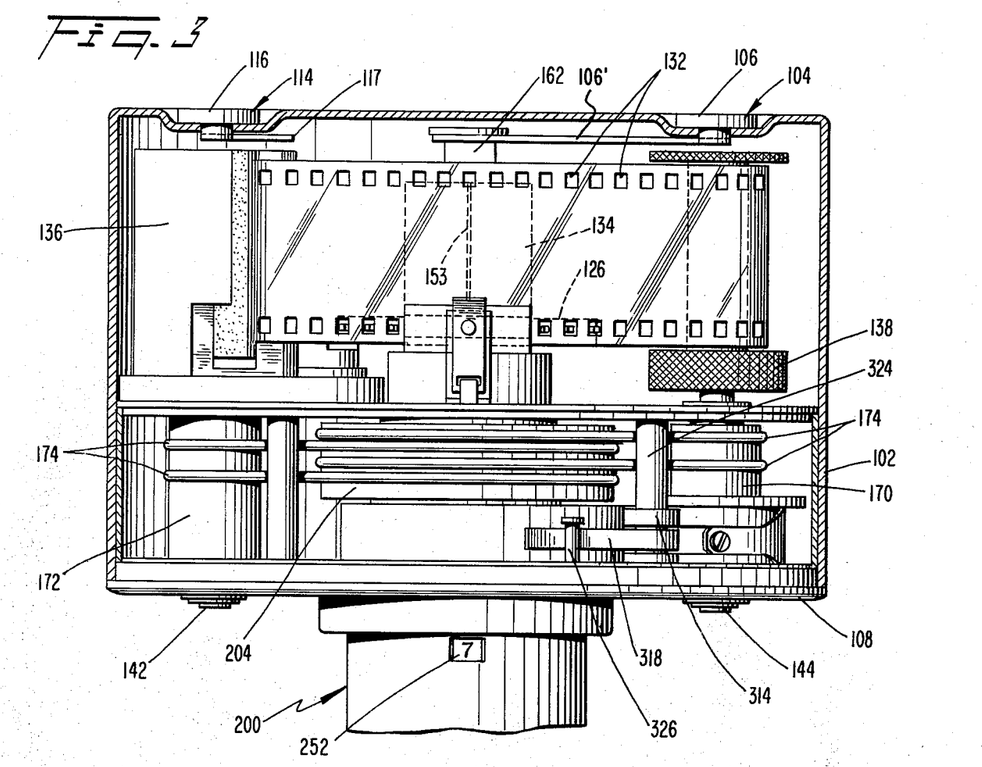
FIG. 3 is a back side view of the panoramic camera of FIG. 1 with the outer housing cut away.
Figures 5, 6, 7:
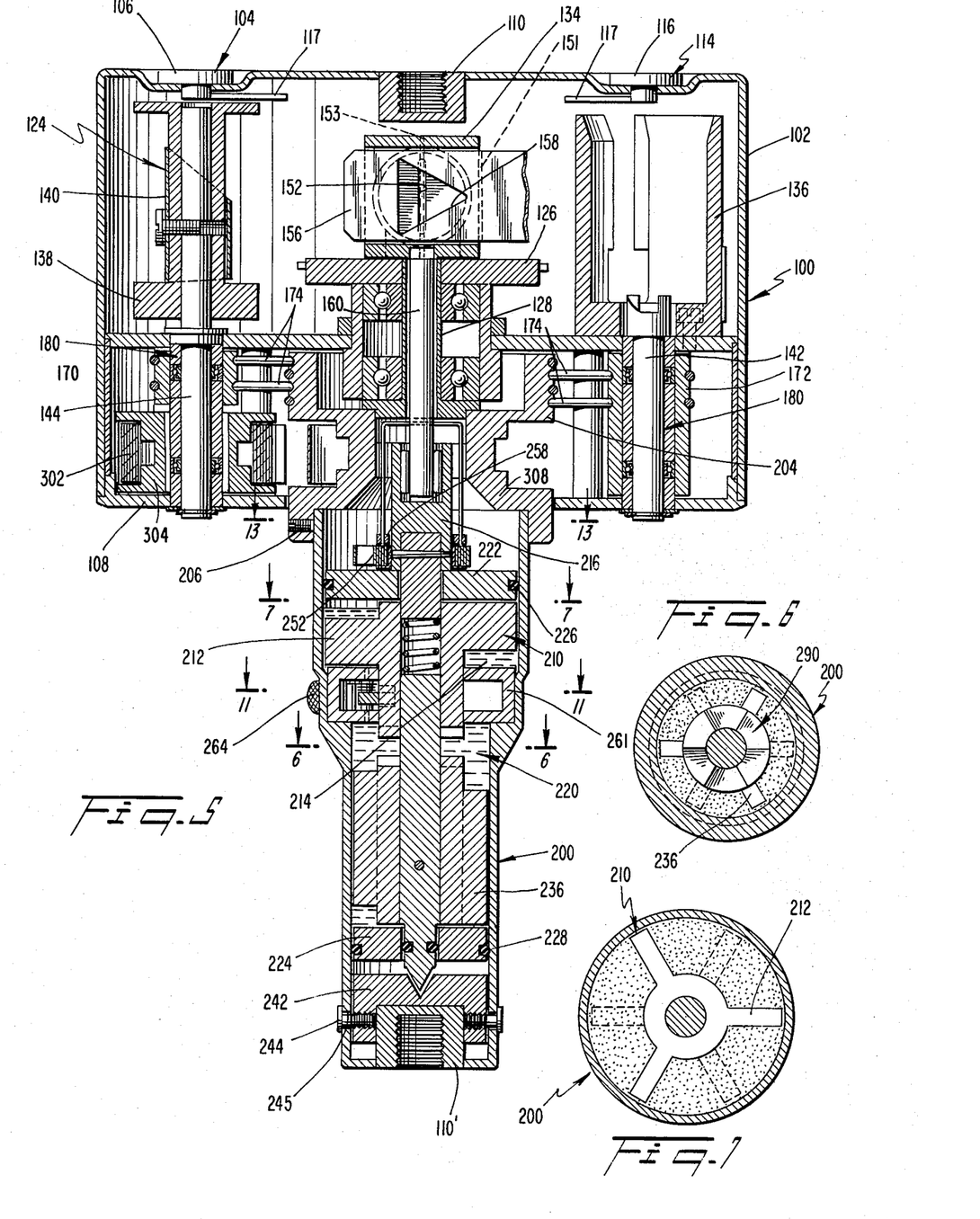
FIG. 5 is a cross-sectional view of the camera of FIG. 1.
FIG. 6 is a view through the line 6—6 of FIG. 5.
FIG. 7 is a view through the line 7—7 of FIG. 5.

With reference now to FIGS. 1 and 5, a panoramic camera according to the present invention includes a main camera portion 100 and a handle 200. The main camera portion 100 includes an outer casing 102 having a generally oval cross-section (see FIG. 2). The oval shaped housing is preferably of brushed aluminum and includes a plurality of recessed controls. A first recess 104 includes a locking mechanism 106, including an arm 106'. The arm 106' (as shown in FIG. 3) can selectively engage (i.e., move beneath) a protrusion 162' (see FIG. 2) of a shutter 162 upon rotation of the locking mechanism 106. In this way, the locking mechanism permits the oval housing to be securely attached to a pan table 108 of the since the shutter 162 is fixed with respect to the pan table 108. Tripod mounting mechanisms 110 and 110' (see FIG. 5) each include a threaded female coupling which is integrally provided in either a top or bottom portion of the oval housing.

Various slots and holes are provided in the exterior oval housing as required. For example, a slit opening 112 (see FIG. 2) is provided in a front portion of the oval housing to selectively permit light to enter the camera.

A second recess 114 receives an iris control mechanism including a dial 116. The dial is connected to a rotatable shaft member 176 by a linkage 117.

The outer oval housing 102 is received by an interior oval housing 118. A flange 120 of the pan table 108 receives a lowermost portion of the oval outer housing. In this way, the oval housing 102 cooperates with the interior oval housing 118 and the pan table 108 to form a closure which is highly impenetrable to light. Furthermore, the use of two sliding oval housing, each of which is made of a metal such as aluminum, provides an outer housing for the main camera portion which is particularly resistant to jolts and shocks. These jolts and shocks to the camera are typically the result of rough handling of the camera such as occurs when the camera is bumped against another object or is dropped to the floor.

Within the oval outer housing 102 and above the inner housing 118 is a film transport mechanism 124. The film transport mechanism 124 includes a film sprocket 126 which is mounted concentrically with a central axis of the camera. The film sprocket 126 is threadably received on a bearing post 128 having a spool 308 fixedly attached thereto (see FIG. 5) and the sprocket 126 includes a plurality of teeth which correspond to the series of holes in a conventional roll of film such as a 35 mm roll of film. A spring biased film shoe 130 (see FIG. 2) urges the film into close contact with the film sprocket 126.

An upper portion of the film which typically includes a second series of holes 132 (see FIG. 3) is slidably received by a curved gate member 134 (see also FIG. 2).

A roll of conventional 35 mm film typically comes packaged in a spool-type housing. The spool-type housing of the film is slidably received by a spool cage 136. A film take up spool 138 receives a free end of the film from the conventional spool of film by means of a spool clip 140. The spool clip 140 securely attaches the free end of the film to the take-up spool 138.

With reference to FIG. 5, the spool cage 136 and the take up spool 138 are rotatably mounted on respective shafts 142 and 144.

Figure 9:
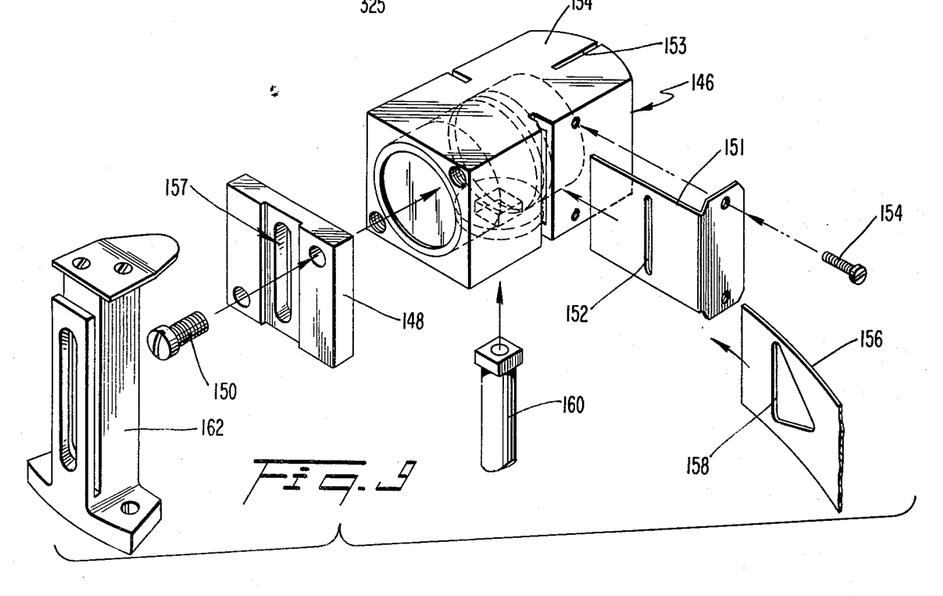
FIG. 9 is an exploded pictorial view of the lens and slit arrangement of the panoramic camera.

With reference now to FIG. 9, a lens housing assembly is illustrated and includes a lens mounting member 146. The curved gate member 134 is integrally formed with the lens mounting member 146 and is arranged at one end thereof. An appropriate lens such as a 25 mm lens or a series of lenses is provided within a cylindrical receptacle of the lens holder 146. The various lenses are held in place by a lens retention member 148 which is securely attached to one side of the lens holder 146 by means of a pair of screws 150. The lens holder 146 includes a vertically arranged slit 153 which is vertically aligned with a central axis of the lens. The slit 153 extends from the film surface forwardly for a portion of the length of the lens holder 146. In this way, the forward edge of the slit is raised substantially off of the surface of the film. Such an arrangement of the slit with respect to the film surface decreases the occurrence of banding of the film.

An iris mask 151 includes a vertically aligned slot 152. The iris mask is provided within a slot of the lens holder 146 and is secured thereto by a pair of screws 154. An f-stop adjustment member 156 which includes a curved triangular orifice 158 is slidably received immediately adjacent to the iris mask 151. In this way, the f-stop of the panoramic camera may be adjusted by a translational movement of the adjustable member with respect to the iris mask.

The lens holder 146 is received on a square key shaft 160. The square key shaft is aligned axially with respect to the camera and is rotatable with respect to the handle 200. The square key shaft, however, is fixed with respect to the main camera portion 100.

Immediately adjacent to the lens retention member 148 is a shutter 162. With additional reference to FIG. 2, the shutter 162 is provided with a vertical slot which is aligned with the vertical slots of both the iris mask and the lens retention member. A movable screen 164 (see also FIG. 1) is slidably received by the shutter member 162 so as to selectively permit and restrict the passage of light through the shutter.

Finally, the lens retention member 148 is provided with a vertically aligned slot 157 which permits the transmission of light to the lens and to the film. In this way, when the shutter is open, light is permitted to travel through the shutter and the lens arrangement so as to expose the film.

The screen 164 of the shutter is operationally attached to the drive mechanism of the panoramic camera in a manner which is more fully explained below. The screen 164 is arranged so that rewinding the film automatically closes the shutter so as to prevent an unintentional exposure of the film.

Figure 4:
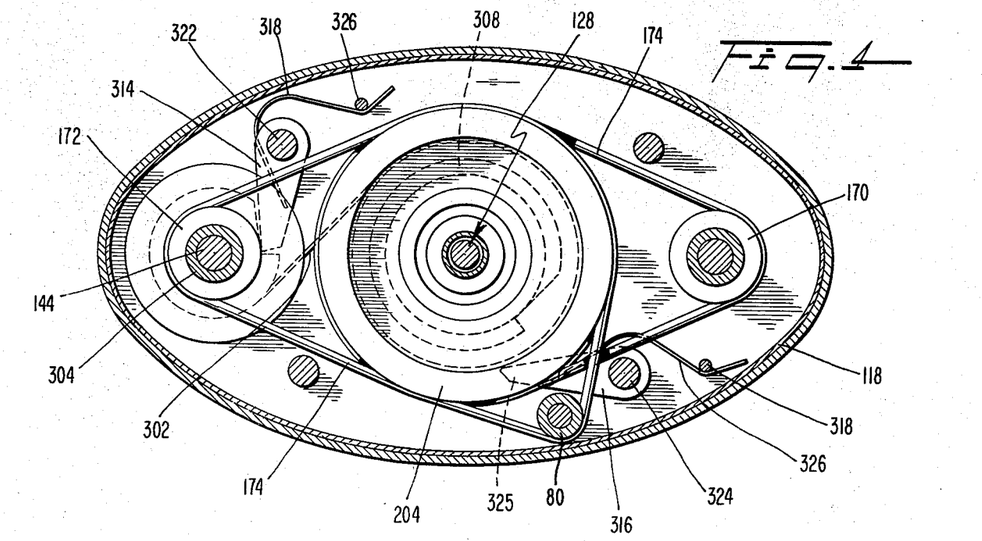
FIG. 4 is a view through the line 4—4 of FIG. 1.

With reference now to FIG. 4, the interior oval housing member 118 encloses a ribbon spring drive mechanism for the panoramic camera. A ribbon spring 302 is forwardly wound on a first spool 304 which spool is freely mounted on the shaft 144 both with respect to the shaft 144 and to the one way clutch 180. The ribbon spring 302 is reversely wound on a second spool 308 which is fixed with respect to and forms a part of the shaft or bearing post 128 (see also FIGS. 8 and 5). The ribbon spring 302 has a tendency to be forwardly wound and this tendency provides a driving force for the panoramic camera.

In this way, the unwinding of the spring 302 from the spool 308 onto the spool 304 "transmits" the energy stored during the winding of the spring onto the spool 308 into energy of motion by causing the spool 304 to orbit about the spool 308 (while causing the pan table to also rotate about the spool 308).

Figure 8:
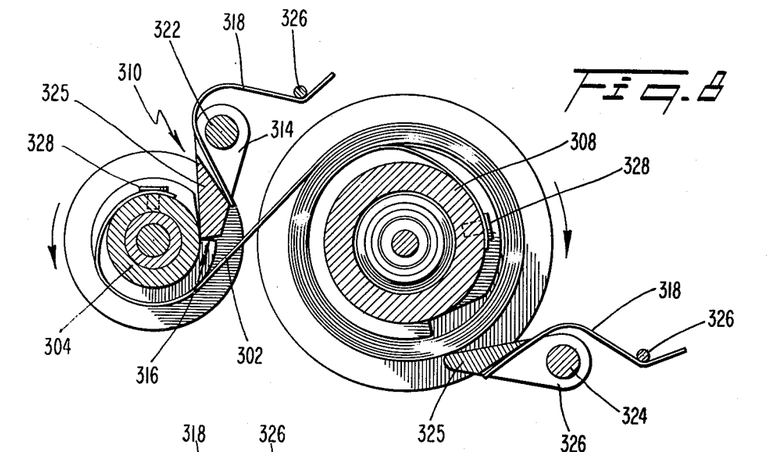
FIG. 8 is a top view of the spring ribbon arrangement of the panoramic camera with the spring ribbon completely rewound.

With reference to FIG. 8, during normal rewinding operation of the panoramic camera, a detent mechanism 310 prevents a further rotation of the spool 304 when the ribbon spring 302 has been completely unwound from the spool 304. The detent mechanism 310 includes a locking member 314 that is spring biased by a resilient member 318 and which normally travels on an outer surface of the ribbon spring (see FIG. 8a). When the ribbon spring 302 has completely unwound from the spool 304, a notch 316 in the spool 304 is exposed to permit engagement of the locking arm 314 with the notch 316 to thereby stop further rotation of the spool 304. During the rewinding operation of the camera, the spool 304 travels (as shown in FIG. 8) counter-clockwise direction and during rewinding the spool 308 travels in a clockwise direction.

Figure 8A:
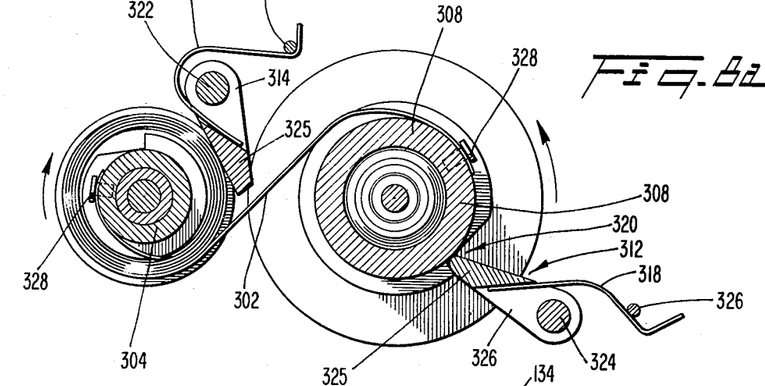
FIG. 8a is a top view of the spring ribbon arrangement of the panoramic camera with the spring ribbon completely unwound.

A second locking detent mechanism 312 includes a second locking arm 316 which also normally travels on an outer surface of the ribbon spring. The locking arm 312 is spring biased by a second resilient member 318. With reference now to FIG. 8a, when the ribbon spring 302 is completely wound onto the first spool 304 (i.e., after forward operation of the camera), the second locking arm 312 engages a notch 320 of the second spool 308. In this way, further winding of the ribbon spring is automatically prevented. Both of the locking arms 312 and 314 are pivotally mounted on a pair of shaft 322, 324 with the resilient members 318 being received by flange portions 325 of each locking arm. The resilient members 318 each act against one of a pair of fixed pivots 326 to urge the locking arms into engagement with the notches of the pair of spools.

The ribbon spring 302 is attached at each end to one of the respective spools 304, 308 by a rivet or screw 328. The relative diameters of the spools 304 and 308 are selected so that the ribbon spring 302 may be completely received by the respective spools when the ribbon spring is either completely wound or completely unwound.

Ribbon springs are commercially available and are commonly identified as "Constant Force Springs". Such springs are incorporated in a motor identified as a "B-wind motor" which motor is available from Ametek, Inc., Hunter Spring Division, 4 Spring Avenue, Hatfield, Pa. The ribbon spring typically is made of either spring steel, bronze or stainless steel.

With reference again to FIG. 1 and also to FIG. 17, a pair of shafts 170, 172 which are concentric with the shafts 144, 142 each receive a pair of belts 174. Each of the belts 174 is received within a groove of one of the shafts 170, 172 and a central shaft 204. The central shaft 204 is concentrically mounted with an axis of the panoramic camera and is securely attached to the handle 200 by a screw 206 (see FIG. 5). During relative rotation of the main camera portion with the handle, the belts 174 rotate the shafts 170, 172. Each of the shafts 170, 172 includes a one way clutch 180 which operatively connects each of the shafts 170, 172 with their respective shafts 144, 142. In this way, during relative rotation of the main camera portion and the handle, only one of the shafts 170, 172 is driven while the other shaft is permitted to freely rotate. The spool 304 is free to rotate with respect to the shaft 144 and is also free to rotate with respect to the one way clutch 180.

Figures 18, 22:
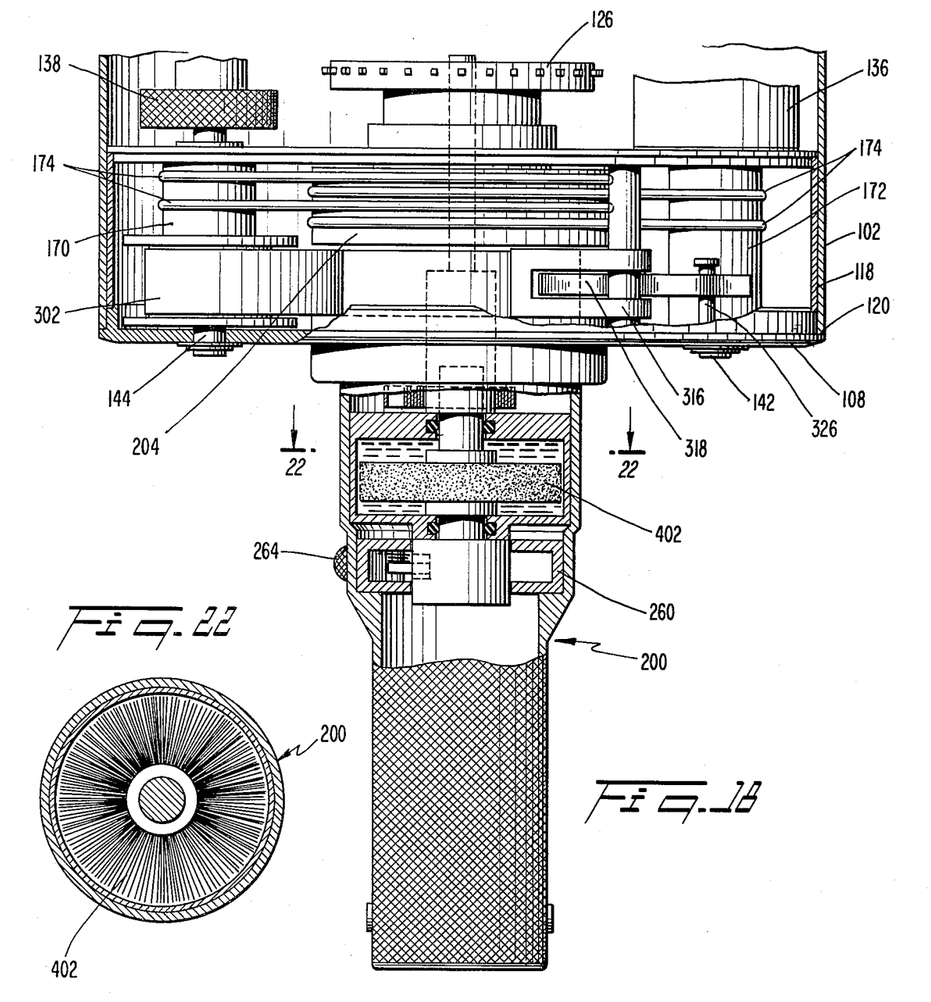

With reference to FIG. 18, during a forward rotation of the main camera portion relative to the handle, the one way clutch of the shaft 172 drivingly connects the shaft 172 with the shaft 142 to advance the film. At this time, the one way clutch of the shaft 170 does not drivingly connect the shaft 170 to the spool 138 (i.e., this clutch is "freewheeling"). Upon rewinding of the spring 302, the directions of rotation of the central shaft 204 relative to the main camera portion is reversed and likewise the roles of the clutches are reversed. During rewinding, the clutch of the shaft 170 drivingly connects the shaft 170 with the spool 138 to wind the film on the spool. At this time, the clutch of the other shaft 172 is "free wheeling" and the spool 136 is free to rotate as necessary.

Figure 12:
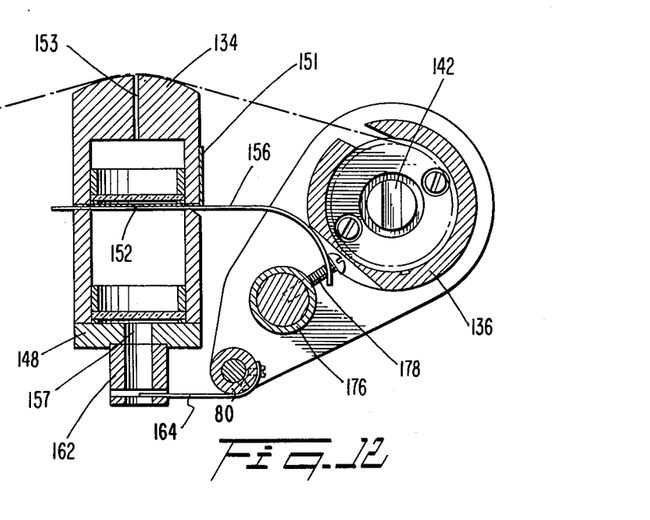
FIG. 12 is a top view of the lens and slit arrangement including a portion of the film spool mechanism.

With reference now to FIG. 12, the shutter mechanism is operatively connected with the spool cage 136 of the film transport mechanism. As shown in FIG. 1, the screen 164 is connected to a rotatable shaft 80. With reference also to FIG. 4, a belt 174 drivingly travels about the shaft 80, the central shaft 204 and the shaft 172. Upon forward rotation (i.e., clockwise) of the main camera portion relative to the handle, the shaft 80 is rotated counter clockwise (when viewing FIG. 4), by the belt 174 to retract the screen 164 (see also FIGS. 1 and 2). Upon a reverse rotation (i.e., counter clockwise in FIG. 4) of the main camera portion relative to the handle, as during rewinding, the shaft 80 would be rotated clockwise to advance the screen 164 in front of the slot 157.

With reference again to FIG. 1, the f-stop adjustment member 156 is securely attached to the rotatable shaft member 176 by a screw 178. The rotatable shaft 176 includes an arm member portion 179 (see FIG. 2) which is pivotably connected with the iris control dial 116 by the linkage 117. Rotation of the iris control dial 116 rotates the shaft 176 to thereby move the f-stop adjustment member 156 relative to the lens and slit arrangement.

Figure 19:
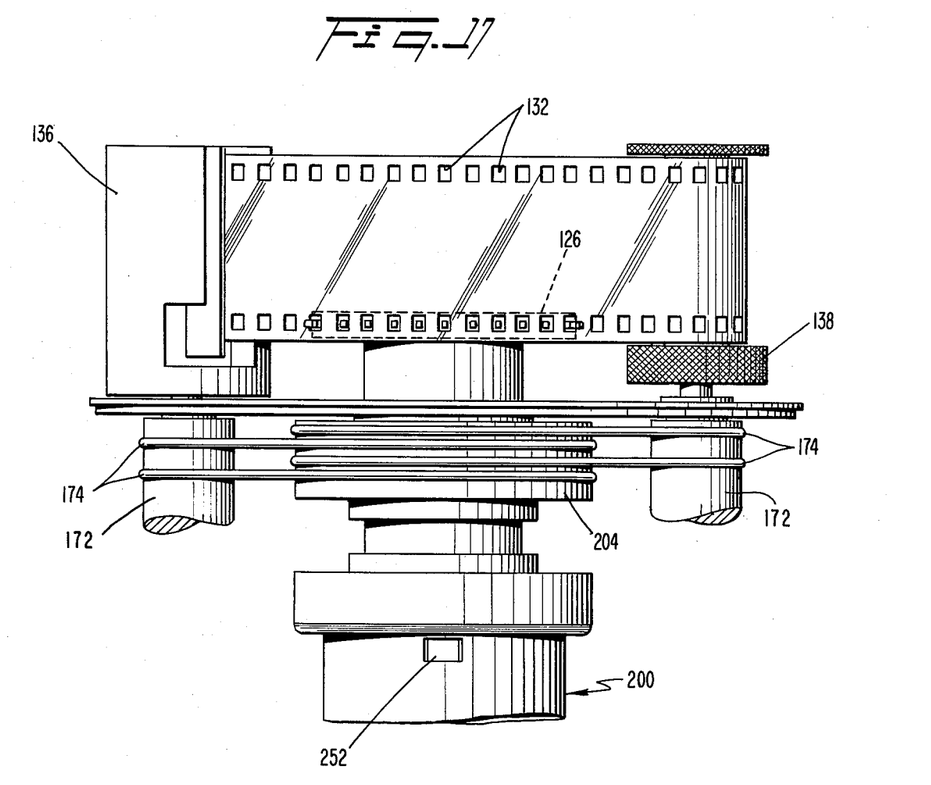
FIG. 19 is a pictorial view of another slit mechanism according to the present invention.

The f-stop adjustment member 156 may preferably include a curved triangular orifice 158' having a logarithmic or geometric curve defining the curved portions of the orifice (see FIG. 19). The particular configuration of the orifice 158 depends upon the preferred exposure characteristics of the panoramic camera.

With reference now to FIG. 5, the handle 200 of the panoramic camera includes a speed governor mechanism 210 which is concentrically arranged with the central axis of the panoramic camera. The speed governor mechanism 210 includes a first brush 212 (see also FIG. 10) having a plurality of radially extending vane portions. The brush 212 is received within a sealed compartment of the handle 200 which is provided with a quantity of fluid 214.

The brush 212 is operatively connected with the lens housing assembly through the shaft 160 through a one-way needle clutch 216. The one way needle clutch 216 operatively connects the brush 212 with the film sprocket 126 when the main camera portion rotates in a forward direction with respect to the handle. During a rewinding of the drive mechanism of the panoramic camera, the one-way needle clutch 216 permits the handle 200 to rotate freely with respect to the main camera portion so that the speed governer mechanism 210 is disconnected during a rewinding of the camera. The one-way needle clutch bearing 216 and all of the other one way clutches are of conventional design.

The brush 212 is provided within a sealed chamber 220 of the handle 200. A pair of sealing members 222 and 224 are each provided with sealing o-rings 226, 228 which are received within grooves of the sealing members. The sealing members 222, 224 are provided on either side of the brush 212 and prevent the unwanted escape of fluid from the sealed compartment of the handle 200. The fluid within the sealed compartment of the handle may include a colloidal suspension having a principle ingredient of cornstarch. The fluid is preferably a thixotropic fluid which further preferably has the characteristic that cracking of the fluid occurs when a solid object is urged through the fluid at a sufficient speed (see FIG. 15). This cracking phenomena is in itself well known. During rotation of the brush 212 within the thixotropic fluid, the thixotropic fluid including for example cornstarch essentially acts as a solid substance if the rotation of the brush exceeds a predetermined value. This predetermined value is dependent upon the consistency, particular ingredients and the relative proportion of the ingredients of the thixotropic fluid.

Thixotropic fluids are well known as are the characteristics of thixotropic fluids. Examples of thixotropic fluids, or "gels", include silicon oil, dimethyl siloxane polymers, hydrous ferric oxide, alumina, vanadium pentoxide, zerconium dioxide, stannic oxide, fine suspensions of certain clays and the like. Thixotropic fluids and the characteristics of such fluids are discussed in the Encyclopedia of Chemical Technology Volume 4, pages 238-241 and Volume 11, pages 739-743 (The Interscience Encyclopedia, Inc., N.Y., N.Y., 1949, 1953) which is hereby incorporated by reference.

Among other advantages, the use of a thixotropic fluid in the chamber 220 typically permits a much smaller speed governing mechanism than would be possible with a non-thixotropic fluid. This advantage results particularly from the maximum permissible speed feature of the thixotropic fluid.

In a preferred embodiment, the thixotropic fluid comprises a collodial solution including a mixture of cornstarch and water. Sugar is added to this mixture to increase the viscosity of the fluid in order to help maintain the cornstarch in suspension. Only a relatively small amount of water is necessary in order to provide a colloidal suspension having the desired viscosity. In addition, a heavy alcohol may be added to the solution to prevent freezing of the solution in cold weather. The alcohol is preferably a heavy alcohol in order to help maintain the uniform consistency of the solution.

With reference again to FIG. 5, a second brush 236 is provided within the sealed chamber of the handle concentrically with the central axis of the panoramic camera. The second brush has a substantially greater surface area than the first brush 212 and is selectively connectable to the first brush. In this way, the additional brush permits one to readily vary the maximum rotational speed of the main camera portion with the handle.

Figure 14:
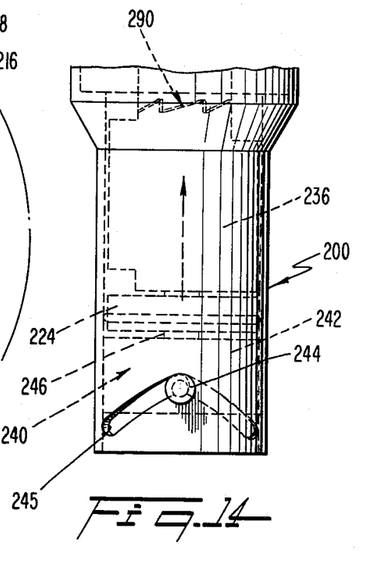
FIG. 14 is a side view of the handle of the panoramic camera illustrating the speed selector mechanism.

With reference to FIG. 14, a speed selector mechanism 240 includes an engagement member 242 which is carried within the handle 200 on a pair of stub shafts 244. The stub shafts travel within a pair of inclined slots 245 of the handle with movement of the stub shafts within the slots urging the engagement member 242 axially with respect to the handle. Axial movement of the engagement member 242 urges a spring biased shaft 246 of the second brush 236 to move axially with respect to the handle. In an uppermost position, the second brush 236 operatively engages the first brush 212 so that both brushes are rotated within the fluid during a forward relative rotation of the main camera portion with the handle.

In other embodiments of the present invention three or more brushes (not illustrated) may be provided in order to permit a greater number of speeds. Furthermore, a continuously variable speed governor utilizing a friction mechanism is possible to permit a continuously variable range of speeds rather than one or two discreet speeds. Such modifications of the apparatus according to the present invention are intended to be within the scope of the present invention as recited in the appended claims.

With reference now to FIG. 10, a ratchet arrangement 290 having cooperating surfaces provided on a lowermost portion of the upper spring 212 and an uppermost portion of the lower brush 236 permits the two brushes to be operatively connected when the second brush 236 is in an uppermost position.

Figure 13:
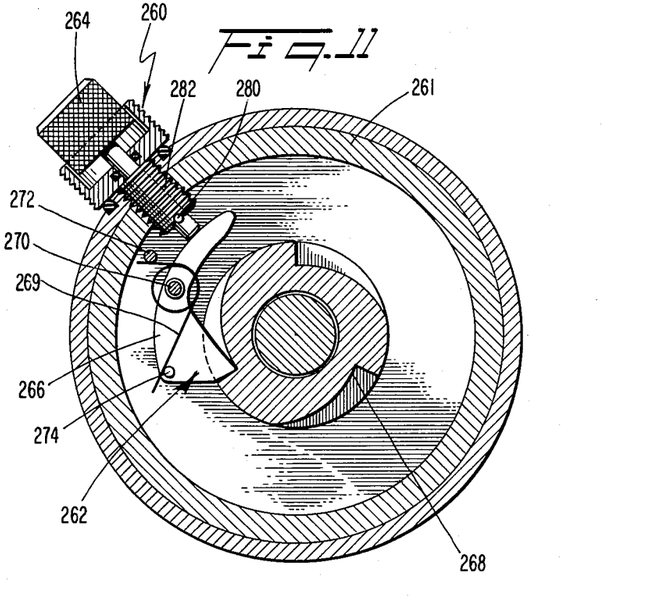
FIG. 13 is a view through the line 13—13 of the panoramic camera of FIG. 5 illustrating the frame indicator mechanism.

A film counter 250 (see FIGS. 10 and 13) includes a resilient ribbon 252 which is forwardly wound on a pin 256 and is also wound on a spool 258. Furthermore, as shown in FIGS. 5 and 10, the spool 258 is connected with the shaft 160 through a pair of arms 160' so that the spool 258 rotates with the shaft 160. The pin 256, however, is provided on a member 222 which is fixed relative to the handle 226. In this way, during a forward rotation of the main camera portion with respect to the handle, the spool 258 rotates relative to both the pin 256 and the member 256'. Likewise, upon rewinding of the spring 302, the main camera portion rotates in a reverse direction relative to the handle with the spool 258 rotating relative (and in a reverse direction) with respect to the pin 256 and the member 222. In this way, the resilient ribbon 252 of the film counter advances during a forward rotation of the camera and rewinds during a rewinding of the camera. The spool 258 is concentrically aligned with the central axis of the panoramic camera and is operatively connected to the shaft 160 through the arms 160' with the shaft 160 operatively connected to the brush 212 through the one-way clutch needle bearing.

Rotation of the main camera portion with respect to the handle is selectively controlled by a trigger mechanism 260 (see FIG. 11) which is contained within a housing 261. A ratchet assembly 262 permits rotation in intergral steps of 120°. Depression of a switch or trigger 264 pivots a locking member 266 out of engagement with a notch 268 of the upper brush 212. The locking member 226 is spring biased into engagement with a shaft portion of the brush 212. Accordingly, depression of the switch 264 until the locking member 266 has released the brush 212 will result in a 120° rotation of the main camera portion.

Figure 11:
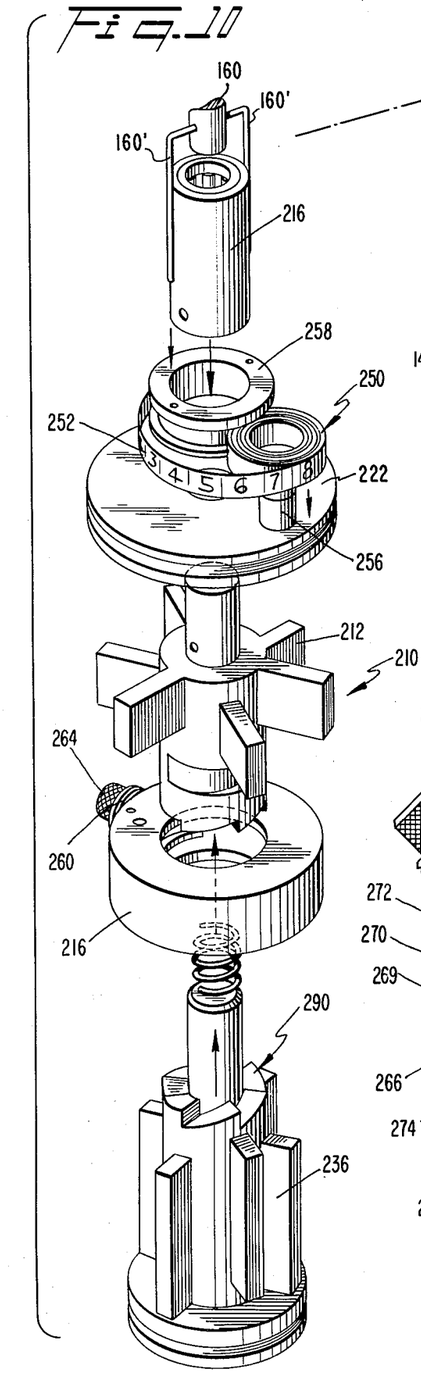
FIG. 11 is a view through the line 11—11 of FIG. 5 illustrating the trigger mechanism.

The locking member 266 is spring biased by a resilient member 269 which is carried on a pin 270. The resilient member 269 acts against a fixed pin or stop 272 and against a pin 274 which is provided on the stop member.

The trigger 260 is provided with a locking pin 280 which is received within a notch of a threaded outer housing 282 of the trigger mechanism. In this way, depression and rotation of the trigger 264 permits the trigger to be maintained in a depressed configuration whereby the brush 212 is free to rotate through more than 120°.

The resilient member 269 simultaneously urges one side of the lock member 266 into close abutment with the brush 212 and urges the other side of the stop member against the trigger 264. In this way, the trigger 264 is resiliently urged outwardly by the lock member 266.

Figures 15, 16:
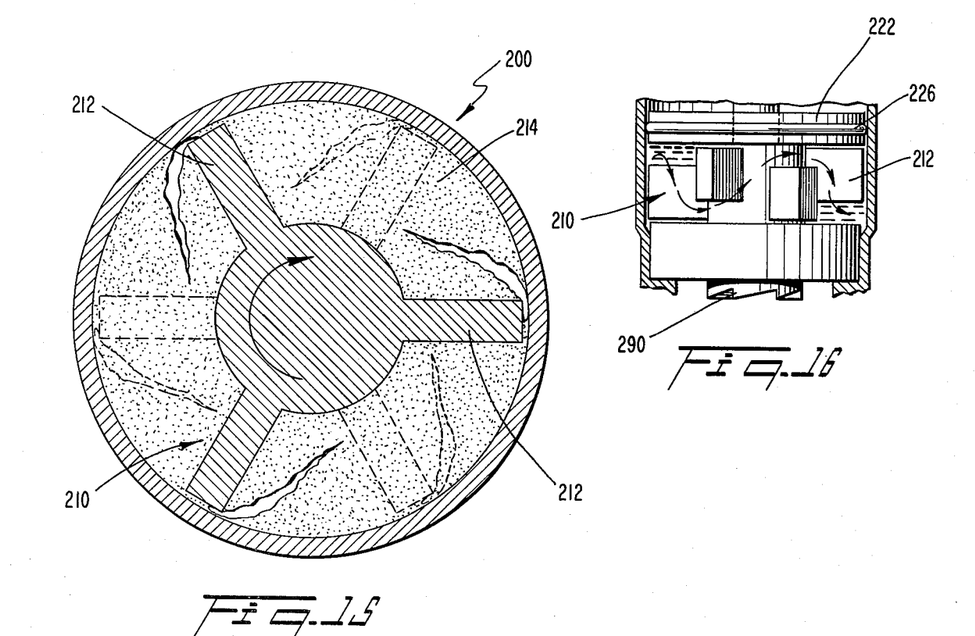
FIG. 15 is a view through the line 15—15 of FIG. 1 illustrating cracking of a cornstarch colloidal solution during rotation of the main camera portion with respect to the handle.
FIG. 16 is a side view of the speed governor illustrating the path of fluid about the brushes.

With reference now to FIGS. 6 and 7, the brush 212 includes a series of upper vanes which extend downwardly only a fraction of the axial length of the brush 212. With reference to FIG. 16, fluid within the sealed housing may travel beneath the upper series of brushes and then above a lower series of brushes. In this way a sinusoidal path for the fluid is provided within the sealed housing about the plurality of brush portions of the brush 212.

With reference now to FIG. 18, a second more preferred embodiment of the speed governor includes a rotary brush 402 having a plurality of individual bristles which extend radially from a central shaft of the brush (see also FIG. 22). Silicon oil, in particular dimethyl siloxane polymer, is provided within a sealed compartment of the handle 200. Alternatively, a heavy hydrocarbon fluid having a high viscosity such as the commercially available product identified by the trademark "STP" maybe provided within the sealed compartment of the handle 200. Silicon oil is preferable, however, due to the greater stability of viscosity of silicon oil over various temperature ranges. The rotary brush is operatively connected to the film sprocket 126 in the same manner as is rotary brush 212. Rotation of the rotary brush 402 through the silicon oil is limited to a maximum speed of rotation by contact between the bristles of the rotary brush the silicon oil. The particular characteristics of the silicon oil such as its viscosity as a function of temperature; its weight per unit mass; the volume of fluid and the size of the bristles of the brush all determine the operating characteristics of the speed governor.

In many environments, use of the silicon oil and brush arrangement is preferable to the cornstarch solution and brush arrangement since the silicon oil does not have a tendency to evaporate or otherwise leave the sealed compartment of the handle 200. If, for example, water should evaporate from the cornstarch solution, the viscosity of the cornstarch solution would increase to an undesirable level thereby preventing normal operation of the camera. Accordingly, the cornstarch solution would have to be either replaced or be provided with sufficient liquid in order to have a more desirable viscosity.

Figure 20:
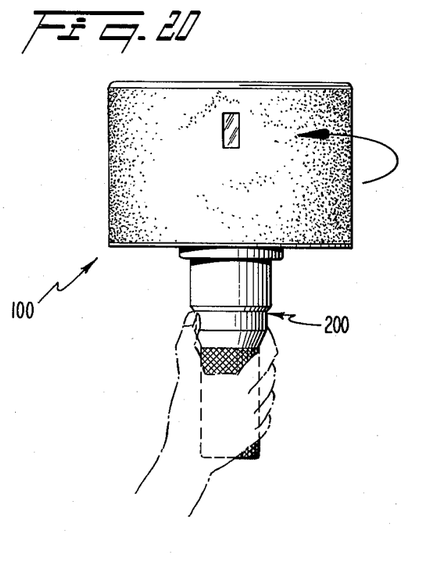
FIG. 20 is a pictorial illustration of rotation of the main camera portion while the handle is held stationary.
Figure 21:
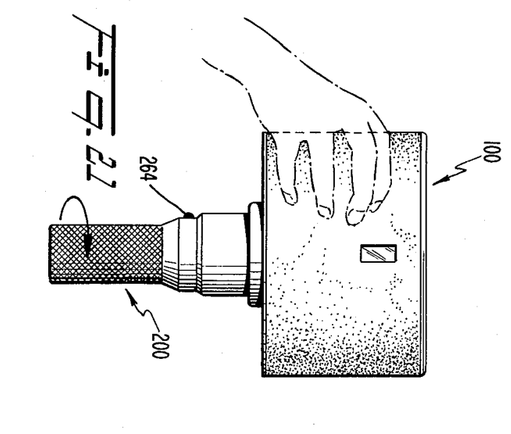
FIG. 21 is an illustration of operation of the panoramic camera with the handle rotating relatively with respect to a stationary main camera portion; and, FIG. 22 is a view through the line 22—22 of FIG. 18 illustrating the brush of the speed governor.

In operation, the panoramic camera may be operated in at least two modes. With reference to FIG. 20, a first mode is provided with the handle of the panoramic camera being held stationary while the main camera portion rotates relative thereto. A second mode, a scanning mode, is provided by holding the main camera portion stationary while the handle is permitted to freely rotate (see FIG. 21.)

The panoramic camera is prepared for operation by loading a roll of photographic film into the main camera portion by sliding a spool of 35 millimeter film into the film cage 136. The film is threaded past the lens and slit arrangement with the end of the film being received by the film take-up spool 138. Notches of the film are received by toothing of the film advance sprocket 126. Preferably, the film drive sprocket has 33 teeth provided about a periphery of the sprocket. The lens and slit arrangement includes a 25 mm lens which provides a 25 mm/33 tooth arrangement for the panoramic camera.

The panoramic camera is driven by a ribbon spring drive mechanism. The ribbon spring is wound onto a first spool in a reverse manner by rotation of the handle with respect to the main camera portion. Depression of the trigger permits the handle to rotate relative to the main camera portion in increments of 120°.

The lens and slit arrangement and the film sprocket are all operatively connected to a speed governor which is provided in the handle. Accordingly, forward rotation of the handle with respect to the main camera portion rotates a brush of the speed governor. The brush is provided within a fluid to thereby limit the maximum speed of rotation to a constant value. In this way, banding of the film is substantially reduced.

A film transport mechanism including the spool cage and take-up spool are driven on a pair of rotatable shafts by a pair of belts. The belts are received by a central pulley which is fixedly attached to the handle.

The f-stop of the panoramic camera may be adjusted by a translational movement of a f-stop adjustment member with respect to a slit. The slit is provided within the lens housing of the panoramic camera and permits the selective exposure of the film. An automatically controlled slit is provided for the outer housing member of the main camera portion. Forward rotation of the main camera portion automatically opens the slit with reverse winding of the main camera portion to rewind the film and ribbon spring automatically closing the slit.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A panoramic camera, comprising:
   a main camera portion;
   a handle which is rotatably connected to the main camera portion; and
   drive means for selectively rotating the main camera portion with respect to the handle including a ribbon spring and first and second spring spools, the ribbon spring being reversely wound on the first spring spool, said first spring spool being axially aligned with the handle and said second spring spool orbiting about said first spring spool during said rotation of the main camera portion with respect to the handle.

2. The panoramic camera of claim 1, wherein the main camera portion has a central axis and the handle is concentrically arranged with respect to the central axis.

3. The panoramic camera of claim 1, further comprising:
   rotation limiting means for selectively limiting the extent of rotation of the first and second spools during winding and unwinding of the ribbon spring.

4. The panoramic camera of claim 3, wherein the rotation limiting means includes a pair of pivotable members which selectively engage respective notches of the pair of spools.

5. The panoramic camera of claim 1, further comprising:
   speed governing means for limiting the speed of rotation of the main camera housing with respect to the handle.

6. A panoramic camera, comprising:
   a main camera portion;
   a handle which is rotatably connected to the main camera portion;
   drive means for selectively rotating the main camera portion with respect to the handle including a ribbon spring and first and second spring spools, the ribbon spring being reversely wound on the first spring spool; and
   speed governing means for limiting the speed of rotation of the main camera housing with respect to the handle the speed governing means including a chamber containing a fluid and brush means for contacting the fluid, the brush means including a brush which is rotatably mounted within the chamber.

7. The panoramic camera of claim 6, wherein the fluid is a hydrocarbon liquid.

8. The panoramic camera of claim 6, wherein the fluid is a dimethyl siloxane polymer.

9. The panoramic camera of claim 8, wherein the fluid is a silicon oil.

10. The panoramic camera of claim 6, further comprising:
    one-way clutch means for operatively connecting the speed governor to the drive means during a forward rotation of the main camera portion with respect to the handle and for permitting the ribbon spring of the drive means to be freely rewound during a reverse rotation of the main camera portion with respect to the handle.

11. The panoramic camera of claim 1, further comprising:
    film transport means for advancing film within the main camera portion, the film transport means including first and second drive pulleys which are operatively connectible with the drive means.

12. The panoramic camera of claim 11, wherein the film transport means further includes first film transport clutching means for operatively connecting one of the drive pulleys with the drive means during a forward rotation of the main camera portion with respect to the handle.

13. The panoramic camera of claim 12, wherein the film transport means further includes second film transport clutching means for operatively connecting the other one of the drive pulleys with the handle during a reverse rotation of the main camera portion with respect to the handle, whereby the film is rewound with rewinding of the spring.

14. The panoramic camera of claim 6, wherein the fluid is a thixotropic fluid.

15. The panoramic camera of claim 14, wherein the thixotropic liquid further includes cornstarch.

16. The panoramic camera of claim 6, wherein the speed governing means includes a plurality of brushes which are selectively operatively connectible with the drive means whereby the speed of rotation of the main camera housing with the handle may be variously limited.

17. The panoramic camera of claim 1, wherein the main camera portion includes an outer housing having outer and inner members, the outer member being telescopically received by the inner member.

18. The panoramic camera of claim 17, wherein the outer and inner members have an oval cross section.

19. The panoramic camera of claim 18, wherein the outer and inner members are of metal.

20. The panoramic camera of claim 1, further comprising:
    counting means for indicating the extent of rotation of the main camera portion with respect to the handle whereby a quantity of exposed film may be measured, the counting means including first and second counting spools and a counting ribbon spring, the counting ribbon spring being forwardly wound on one counting spool and reversely wound on the other counting spool.

21. The panoramic camera of claim 1, further comprising:

trigger means for selectively permitting rotation of the main camera portion with respect to the handle.

22. The panoramic camera of claim 6 wherein the speed governing means is adjustable to permit the speed of rotation to be varied.

23. The panoramic camera of claim 6 wherein the chamber of the speed governing means is sealed, the chamber being sealed by at least a pair of sealing O-rings.

24. The panoramic camera of claim 1 further comprising:
means for automatically closing a shutter of the camera when film of the camera is being rewound, thereby preventing a double-exposure of the film.

25. The panoramic camera of claim 1 further comprising:
iris means for adjusting an amount of light admitted to film of the camera, the iris means including an iris mask having a slot for the transmission of light and an adjustment member having a generally triangularly shaped orifice, the adjustment member being slidingly movable relative to the iris mask.

26. The panoramic camera of claim 25 wherein the iris mask and adjustment member are received by a lens mounting member having at least one lens for focusing light onto the film, the lens mounting member further having a slit provided between the iris mask and the film with a forward edge of the slit arranged substantially away from the surface of the film to thereby prevent banding of the film.

27. In a panoramic camera having a main camera portion, a handle, film transport means for selectively advancing film during operation of the camera, and a spring drive means, the improvement comprising means for rotatably connecting the handle to the main camera portion and for operatively connecting the handle to the film transport means, whereby exposed film is rewound within the main camera portion during a reverse rotation of the handle with respect to the main camera portion.

28. A panoramic camera, comprising:
a main camera portion;
a handle which is rotatably connected to the main camera portion;
drive means for selectively rotating the main camera portion with respect to the handle including a ribbon spring and first and second spring spools, the ribbon spring being reversely wound on the first spring spool; and
film transport means for advancing film within the main camera portion, the film transport means including first and second drive pulleys which are operatively connectible with the drive means, the film transport means further including
first film transport clutching means for operatively connecting one of the drive pulleys with the drive means during a forward rotation of the main camera portion with respect to the handle, and
second film transport clutching means for operatively connecting the other one of the drive pulleys with the handle during a reverse rotation of the main camera portion with respect to the handle, the film being rewound with rewinding of the spring.

29. A panoramic camera, comprising:
a main camera portion;
a handle which is rotatably connected to the main camera portion;
drive means for selectively rotating the main camera portion with respect to the handle including a ribbon spring and first and second spring spools, the ribbon spring being reversely wound on the first spring spool; and counting means for indicating the extent of rotation of the main camera portion with respect to the handle whereby a quantity of exposed film may be measured, the counting means including first and second counting spools and a counting ribbon spring, the counting ribbon spring being forwardly wound on one counting spool and reversely wound on the other counting spool.

30. A panoramic camera, comprising:
a main camera portion;
a handle which is rotatably connected to the main camera portion; and
drive means for selectively rotating the main camera portion with respect to the handle including a ribbon spring and first and second spring spools, the ribbon spring being reversely wound on the first spring spool, one of said first and second spring spools orbiting about the other spring spool during said selective rotation of the main camera portion with respect to the handle.

31. The panoramic camera of claim 30 wherein said other spring spool is axially aligned with the handle.

32. The panoramic camera of claim 31 wherein said other spring spool is fixedly mounted with respect to said handle.

* * * * *